(12) United States Patent
Huang et al.

(10) Patent No.: US 11,361,001 B2
(45) Date of Patent: Jun. 14, 2022

(54) SEARCH USING DATA WAREHOUSE GRANTS

(71) Applicant: SIGMA COMPUTING, INC., San Francisco, CA (US)

(72) Inventors: Donald Huang, San Francisco, CA (US); James L. Gale, San Francisco, CA (US); Massimo D. Siboldi, San Francisco, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 23 days.

(21) Appl. No.: 16/913,103

(22) Filed: Jun. 26, 2020

(65) Prior Publication Data

US 2020/0409979 A1 Dec. 31, 2020

Related U.S. Application Data

(60) Provisional application No. 62/867,381, filed on Jun. 27, 2019.

(51) Int. Cl.
*G06F 16/00* (2019.01)
*G06F 16/28* (2019.01)
*G06F 16/245* (2019.01)
*G06F 16/22* (2019.01)

(52) U.S. Cl.
CPC ........ *G06F 16/283* (2019.01); *G06F 16/2272* (2019.01); *G06F 16/245* (2019.01)

(58) Field of Classification Search
CPC ... G06F 16/283; G06F 16/245; G06F 16/2272

USPC .......................................................... 707/600
See application file for complete search history.

(56) References Cited

U.S. PATENT DOCUMENTS

| | | | |
|---|---|---|---|
| 7,765,295 B2 | 7/2010 | Anastas et al. | |
| 8,078,624 B2* | 12/2011 | Daya | G06F 21/6218 707/741 |
| 8,667,456 B1* | 3/2014 | Czymontek | G06F 8/33 707/696 |
| 9,904,602 B1 | 2/2018 | Auchmoody et al. | |
| 9,953,011 B1* | 4/2018 | Anderson | G06F 40/106 |
| 2002/0143692 A1* | 10/2002 | Heimermann | G06Q 30/06 705/26.1 |
| 2007/0005564 A1* | 1/2007 | Zehner | G06F 16/283 |
| 2010/0333116 A1* | 12/2010 | Prahlad | G06F 16/1844 713/153 |
| 2013/0110827 A1* | 5/2013 | Nabar | G06Q 10/00 707/E17.014 |

(Continued)

OTHER PUBLICATIONS

International Search Report and Written Opinion, PCT/US2020/039869, dated Oct. 14, 2020, 9 pages.

*Primary Examiner* — Thanh-Ha Dang (57) ABSTRACT

Search using data warehouse grants including determining, for a user, one or more access grants for a cloud-based data warehouse, each of the access grants comprising an object identifier of a data object accessible to the user; generating a search query comprising one or more search terms and a filter based on each of the access grants; sending the search query to a search indexing service configured to maintain an index of the cloud-based data warehouse; and receiving, in response to the search query, first search results responsive to the one or more search terms and included in a scope based on the filter.

20 Claims, 6 Drawing Sheets

(56) References Cited

U.S. PATENT DOCUMENTS

| | | | | |
|---|---|---|---|---|
| 2013/0212081 A1* | 8/2013 | Shenoy | ............... | G06F 16/951 |
| | | | | 707/706 |
| 2013/0247221 A1* | 9/2013 | Victor | .................... | H04L 63/10 |
| | | | | 726/28 |
| 2013/0332361 A1* | 12/2013 | Ciurea | ................... | G07F 9/009 |
| | | | | 705/44 |
| 2014/0032563 A1* | 1/2014 | Lassen | ............... | G06F 16/9535 |
| | | | | 707/741 |
| 2014/0258261 A1* | 9/2014 | Singh | ................ | G06F 16/9566 |
| | | | | 707/709 |
| 2014/0359029 A1* | 12/2014 | Jagadish | ................ | H04L 51/22 |
| | | | | 709/206 |
| 2014/0379631 A1* | 12/2014 | Sebastian | ............. | G06F 16/245 |
| | | | | 707/607 |
| 2016/0234209 A1* | 8/2016 | Kahol | .................. | H04L 63/0823 |
| 2017/0083914 A1* | 3/2017 | Baker | .................... | G06Q 20/12 |

\* cited by examiner

SEARCH USING DATA WAREHOUSE GRANTS

CROSS-REFERENCE TO RELATED APPLICATIONS

This application is a non-provisional application for patent entitled to a filing date and claiming the benefit of earlier-filed U.S. Provisional Patent Application Ser. No. 62/867,381, filed Jun. 27, 2020.

BACKGROUND

Field of the Invention

The field of the invention is data processing, or, more specifically, methods, apparatus, and products for search using data warehouse grants.

Description of Related Art

Modern businesses may store large amounts of data in remote databases within cloud-based data warehouses. This data may be accessed using database query languages, such as structured query language (SQL). However, some query responses may include too much data to present efficiently in a web application.

SUMMARY

Methods, systems, and apparatus for search using data warehouse grants. Search using data warehouse grants includes determining, for a user, one or more access grants for a cloud-based data warehouse, each of the access grants comprising an object identifier of a data object accessible to the user; generating a search query comprising one or more search terms and a filter based on each of the access grants; sending the search query to a search indexing service configured to maintain an index of the cloud-based data warehouse; and receiving, in response to the search query, first search results responsive to the one or more search terms and included in a scope based on the filter.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
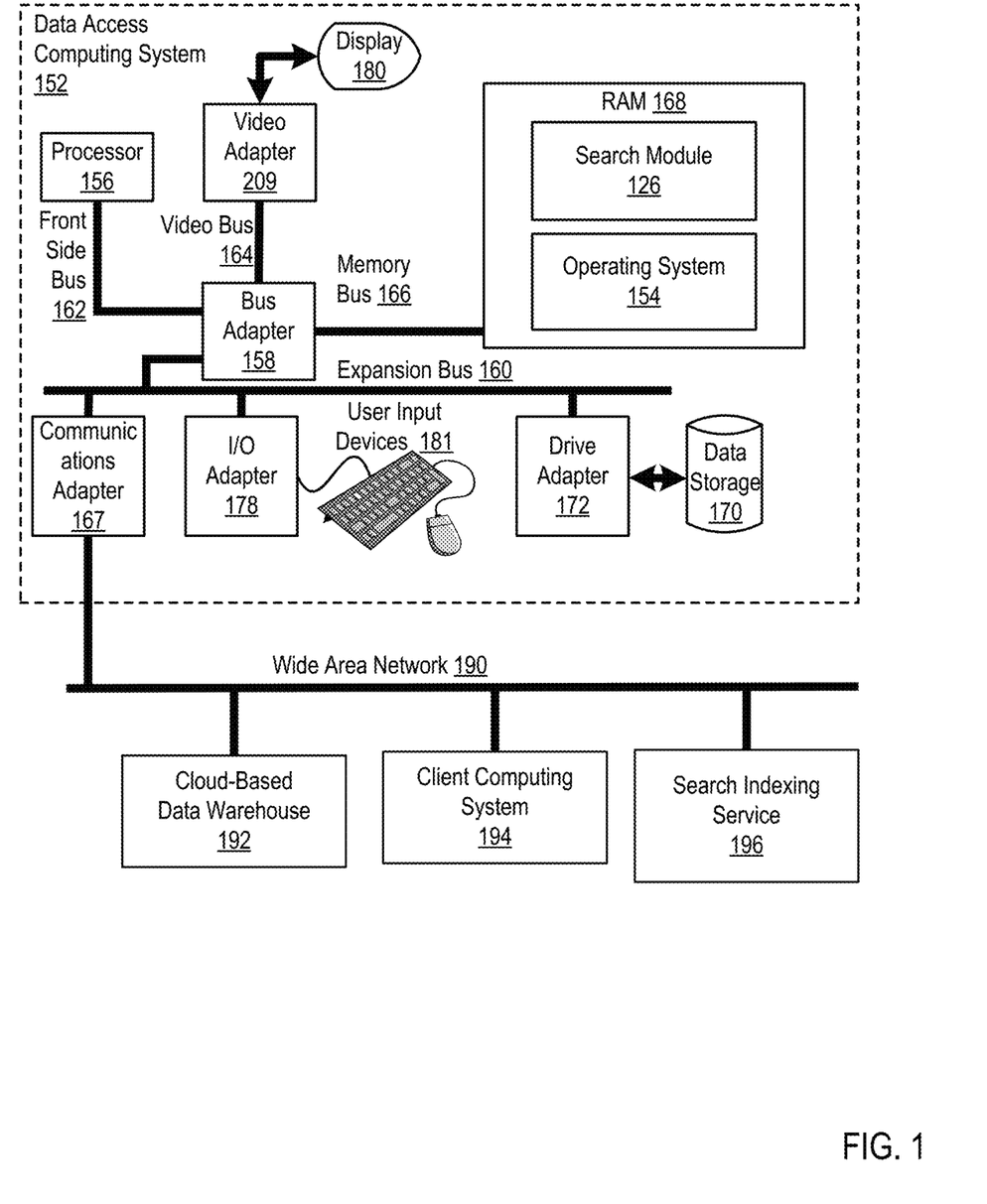
FIG. 1 sets forth a block diagram of an example system configured for search using data warehouse grants according to embodiments of the present invention.

Exemplary methods, apparatus, and products for search using data warehouse grants in accordance with the present invention are described with reference to the accompanying drawings, beginning with FIG. 1. FIG. 1 sets forth a block diagram of automated computing machinery comprising an exemplary data access computing system (152) configured for search using data warehouse grants according to embodiments of the present invention. The data access computing system (152) of FIG. 1 includes at least one computer processor (156) or 'CPU' as well as random access memory (168) (RAM') which is connected through a high speed memory bus (166) and bus adapter (158) to processor (156) and to other components of the data access computing system (152).

Stored in RAM (168) is an operating system (154). Operating systems useful in computers configured for search using data warehouse grants according to embodiments of the present invention include UNIX™, Linux™, Microsoft Windows, AIX™, IBM's i OS™, and others as will occur to those of skill in the art. The operating system (154) in the example of FIG. 1 is shown in RAM (168), but many components of such software typically are stored in non-volatile memory also, such as, for example, on data storage (170), such as a disk drive. Also stored in RAM is the search module (126), a module for search using data warehouse grants according to embodiments of the present invention.

The data access computing system (152) of FIG. 1 includes disk drive adapter (172) coupled through expansion bus (160) and bus adapter (158) to processor (156) and other components of the data access computing system (152). Disk drive adapter (172) connects non-volatile data storage to the data access computing system (152) in the form of data storage (170). Disk drive adapters useful in computers configured for search using data warehouse grants according to embodiments of the present invention include Integrated Drive Electronics (IDE') adapters, Small Computer System Interface (' SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example data access computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example data access computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary data access computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for search using data warehouse grants according to embodiments of the present invention include modems for wired dial-up communications, Ethernet (IEEE 802.3) adapters for wired data communications, and 802.11 adapters for wireless data communications.

The communications adapter (167) is communicatively coupled to a wide area network (190) that also includes a cloud-based data warehouse (192) and a client computing system (194). The cloud-based data warehouse (192) is a computing system or group of computing systems that hosts a database for access over the wide area network (190). The client computing system (194) is a computing system that accesses the database via the data access computing system (152).

Figure 2:
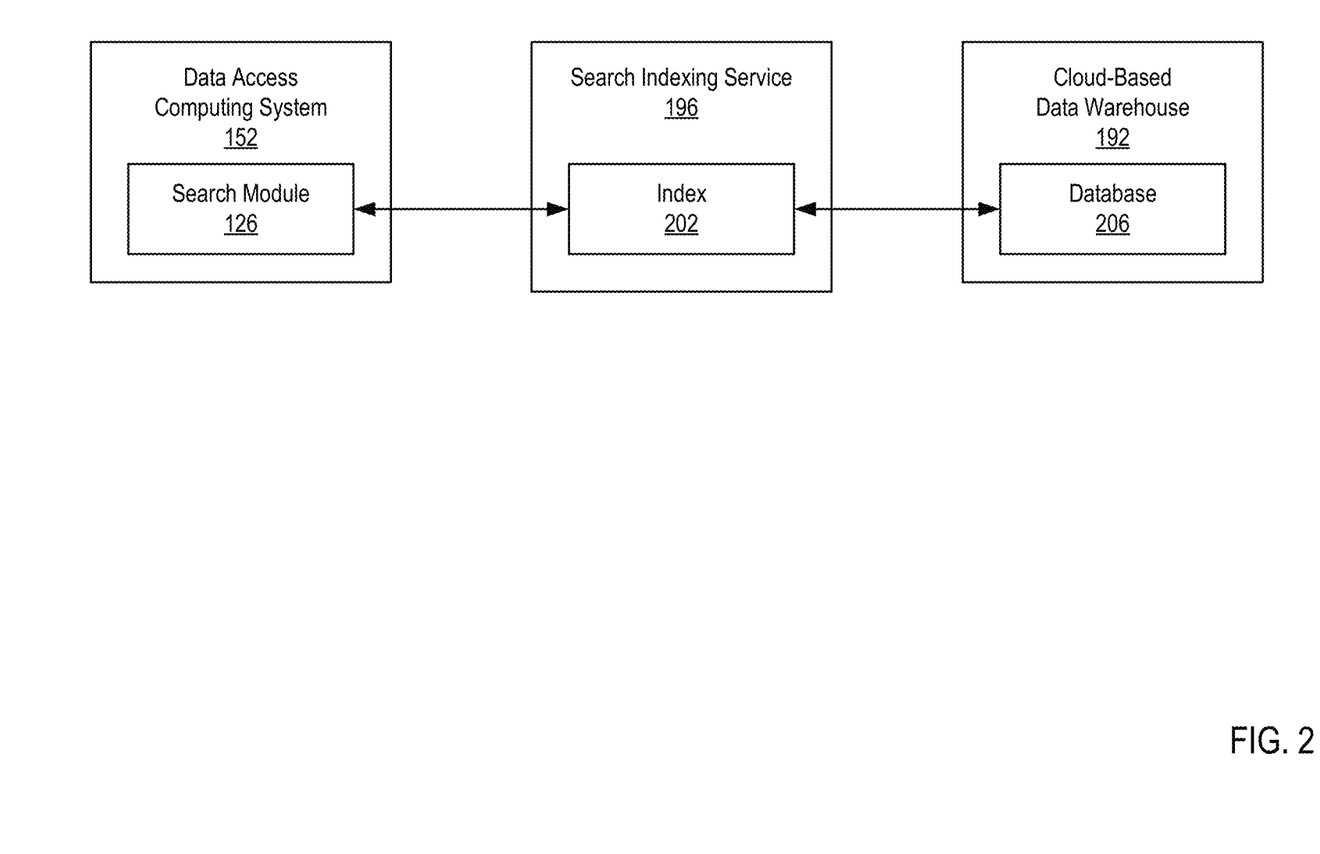
FIG. 2 sets forth a block diagram of an example system configured for search using data warehouse grants according to embodiments of the present invention.

FIG. 2 shows an exemplary block diagram of a system for search using data warehouse grants according to embodiments of the present invention. As shown in FIG. 2, the system includes a data access computing system (152), a cloud-based data warehouse (192) and a search indexing service (196). The data access computing system (152) includes a search module (126). The cloud-based data warehouse (192) includes a database (206).

The search indexing service (196) is hardware, software, or an aggregation of hardware and software configured to index data stored in the cloud-based data warehouse (192) to facilitate a search by the search module (126). Although the search indexing service (196) is shown as an entity separate from the data access computing system (152) and the cloud-based data warehouse (192), it is understood that the search indexing service (196) may instead be implemented at least in part by a module, component, or service of the data access computing system (152) and/or the cloud-based data warehouse (192).

The search indexing service (196) is configured to generate an index (202) describing the data stored in the cloud-based data warehouse (192). A search query provided by the search module (126) would then be applied to the index (202) to identify data relevant to the search query. The search indexing service (196) may be configured to crawl or otherwise update the index (202) of the cloud-based data warehouse (192) in response to the creation of a data object, the removal of a data object, moving of a data object within a file system, at a predefined interval, or on response to other events or criteria.

Each entry in the index (202) may correspond to a data item stored in the cloud-based data warehouse (192) (e.g., a table, a view, a worksheet or other presentation of stored data, a file, a folder, etc.). Each entry in the index (202) may comprise an object identifier uniquely identifying the corresponding data object in the cloud-based data warehouse (192). Each entry in the index (202) may also comprise one or more keywords or other metadata describing the corresponding data object for matching with search terms included in a search query.

Each entry in the index (202) may also comprise an object lineage of the corresponding data object. For example, assume that the data objects are stored in the cloud-based data warehouse according to a hierarchy (e.g., a hierarchical file system). Each data object may have one or more parent data objects. For example, a file data object nested in one or more folders would have one or more folder data objects as parents. Each data object may also have one or more child data objects. For example, a folder data object may have one or more file data objects or one or more other folder data objects as children. As another example, a file data object may have no child data objects. An object lineage of an index (202) entry may indicate, for a given data object, each parent data object for that given data object. The object lineage of an index (202) entry may also indicate each child data object for the given data object. The object lineage may be expressed as one or more object identifiers.

The database (206) is a collection of data stored in the cloud-based data warehouses (192) and management systems for the data. The management systems may receive database queries, such as structure query language (SQL) queries, and respond to queries with a data set. The database (206) may maintain a set of users and enforce certain grants (e.g., permissions) with respect to access to particular portions of data (e.g., tables, views, files, folders, etc.) by particular users or groups of users. For example, a particular table may have grants allowing certain users or groups of users to read data from the table, grants allowing certain users or groups of users to add, delete, or modify rows in the table, etc. The grants may indicate a child or leaf data object (e.g., a file data object with no associated child data objects). The grants may also indicate a parent data object associated with one or more child data objects (e.g., a folder data object with one or more folder data objects or file data objects as children). Accordingly, a grant allowing access to a parent data object would also grant access to its child data objects without the need to explicitly identify a grant for each of its child data objects.

Similarly, the data access computing system (152) may also maintain its own set of users and enforce its own grants. For example, the data access computing system (152) may enforce access to particular tables or views in the database (206) via the data access computing system (152). The data access computing system (152) may also enforce access to analytics tools provided to users to analyze data stored in the database (206) (e.g., worksheets, user interfaces, dashboards, etc.). As both the cloud-based data warehouse (192) and data analytics computing system (152) may maintain their own sets of users and grants, the grants of a given user account in the data access computing system (152) should reflect the grants of a corresponding user account in the cloud-based data warehouse (192). For example, the permissions of a user account in the data access computing system (152) may be synced with the corresponding user account in the cloud-based data warehouse (192).

The search module (126) is configured to submit a search query to the search indexing service (196) and receive, from the search indexing service (196), search results responsive to the search query. The search results may comprise a subset of the index (202) responsive to the search query. The search query may comprise one or more search terms (e.g., keywords, phrases, etc.). Accordingly, the search results may comprise a subset of index (202) entries having keywords or metadata matching all or a portion of the search terms. The search terms may be received from a user (e.g., associated with a user account of the data access computing system (152)).

In order to reduce network bandwidth and processing resources that would be used by returning all search results responsive to a search query, the search indexing service (196) may be configured to return, in response to a search query, a pagination of search results. A pagination of search results is a number of search results less than or equal to a predefined threshold of search results. For example, assuming a pagination threshold of 100 search results, the search indexing service (196) may return the first 100 search results responsive to the search query. The search module (126) may then submit a request for the next pagination of search results, and receive the next 100 search results responsive to the originally submitted search query.

As is set forth above, user accounts of the data access computing system (152) may be assigned grants indicating that a particular data object is accessible to the user account. Accordingly, a user account searching the index (202) may not have access to all of the data objects listed in the index (202). Search results indicating inaccessible data objects would be detrimental to the user experience. Requiring the search module (126) to filter the search results prior to presentation to a user also presents several drawbacks. An additional computational burden would be placed on the data access computing system (152) to filter the search results. Where search result pagination is implemented, the search module (126) may need to repeatedly request and filter search results until a number of search results passing the filtering meets the pagination threshold.

To address these and other shortcomings, the search module (126) may determine, for a user, one or more access grants for the cloud-based data warehouse (192), each of the access grants comprising an object identifier of a data object accessible to the user. For example, the search module (126) may determine the one or more access grants in response to receiving one or more search terms from the user. Determining the one or more access grants may comprise retrieving a listing of the one or more access grants for a user account of the user, or a role or group into which the user account is included. The determined one or more access grants may be expressed or encoded as a list of object identifiers.

The search module (126) may then generate a search query comprising one or more search terms (e.g., one or more search terms received from a user) and a filter based on each of the access grants. For example, generating the search query may include generating the search query comprising the one or more search terms and, as the filter, each object identifier of the one or more access grants. Thus, the resulting search query includes an object identifier of each data object for which a grant has been assigned to the user account.

As an example, assume a user has access grants to data objects "A," "C," and "E." Further assume that the user has provided the search term "Dekalb County." The search module (126) would then generate a search query comprising the search term "Dekalb County" and object identifiers of each data object for which the user has access grants (e.g., data objects "A," "C," and "E."

The search module (126) may then send the search query to the search indexing service (192) configured to maintain the index (202) of the cloud-based data warehouse (196). Thus, the search indexing service receives both the search terms to be applied to the index and object identifiers of each data object for which the user has access grants. In response to the search query, the search module (126) may receive first search results responsive to the one or more search terms and included in a scope based on the filter. A search result responsive to the one or more search terms may comprise an entry of the index (202) comprising keywords or metadata matching the one or more search terms, having a degree of relevancy or similarity relative to the one or more search terms meeting a threshold, or is otherwise responsive to the one or more search terms.

The scope may comprise each object identifier of the one or more access grants (e.g., included in the filter of the search query) and an object lineage of each data object identified in the one or more access grants (e.g., object lineages of each data object identified in the filter of the search query). Accordingly, a search result (e.g., an index (202) entry) is considered within the scope when the entry comprises either an indexed object identifier matching an object identifier in the filter (e.g., the one or more access grants for the user account), or comprises an object lineage including an object identifier in the filter. In other words, an index (202) entry is within the scope when its corresponding data object is explicitly identified in the filter, or when a parent data object of the corresponding data object is identified in the filter.

For example, the search indexing service (196) may be configured to identify, from a plurality of index (202) entries of the index (202), one or more index (202) entries responsive to the one or more search terms and comprising: an indexed object identifier included in the filter or an object lineage at least partially included in the filter. The search indexing service (196) may then generate the first search results based on the identified one or more entries.

As an example, assume index (202) entries for data objects "A," "B," "C," and "D" are responsive to search terms included in a search query from a user. Assume a filter of the search query identifies data objects "A," "C," and "E." In other words, the user has access grants for data objects "A," "C," and "E." In this example, index (202) entries for data objects "A" and "C" would be included in search results as they are both responsive to the search terms of the search query and included in the scope based on the filter.

Continuing with the example above, assume that the index (202) entry for data object "B" also comprises an object lineage of "E→F," indicating that data object "B" is a child of parent data object "E," which is itself a child of parent data object "F." Though data object "B" is not explicitly indicated in the filter, the index (202) entry for data object "B" would still be included in the scope as its object lineage includes a data object identifier (data object "E") included in the filter.

Further continuing with this example, assume that the index (202) entry for data object "D" also comprises an object lineage of "G→F," indicating that data object "D" is a child of parent data object "G," which is itself a child of parent data object "F." Here, the index (202) entry for data object "D" would not be included in the scope as neither its indexed object identifier nor any object identifier in its object lineage are included in the filter.

The first search results may comprise a first pagination of search results. Accordingly, the search module (126) may request a second pagination of search results and receive second search results comprising the second pagination of search results. The second search results are also responsive to the one or more search terms and included in a scope based on the filter. For example, search indexing service (196) may be configured to generate a corpus of search results responsive to the one or more search terms and included in a scope based on the filter. The search indexing service (196) may then return, in response to the search query, the first search results (e.g., a first pagination of search results) as a subset of the corpus of search results. The search indexing service (196) may then return additional subsets (e.g., paginations) of search results in response to requests from the search module (126) without regenerating the corpus of search results or performing additional search operations.

Figure 3:
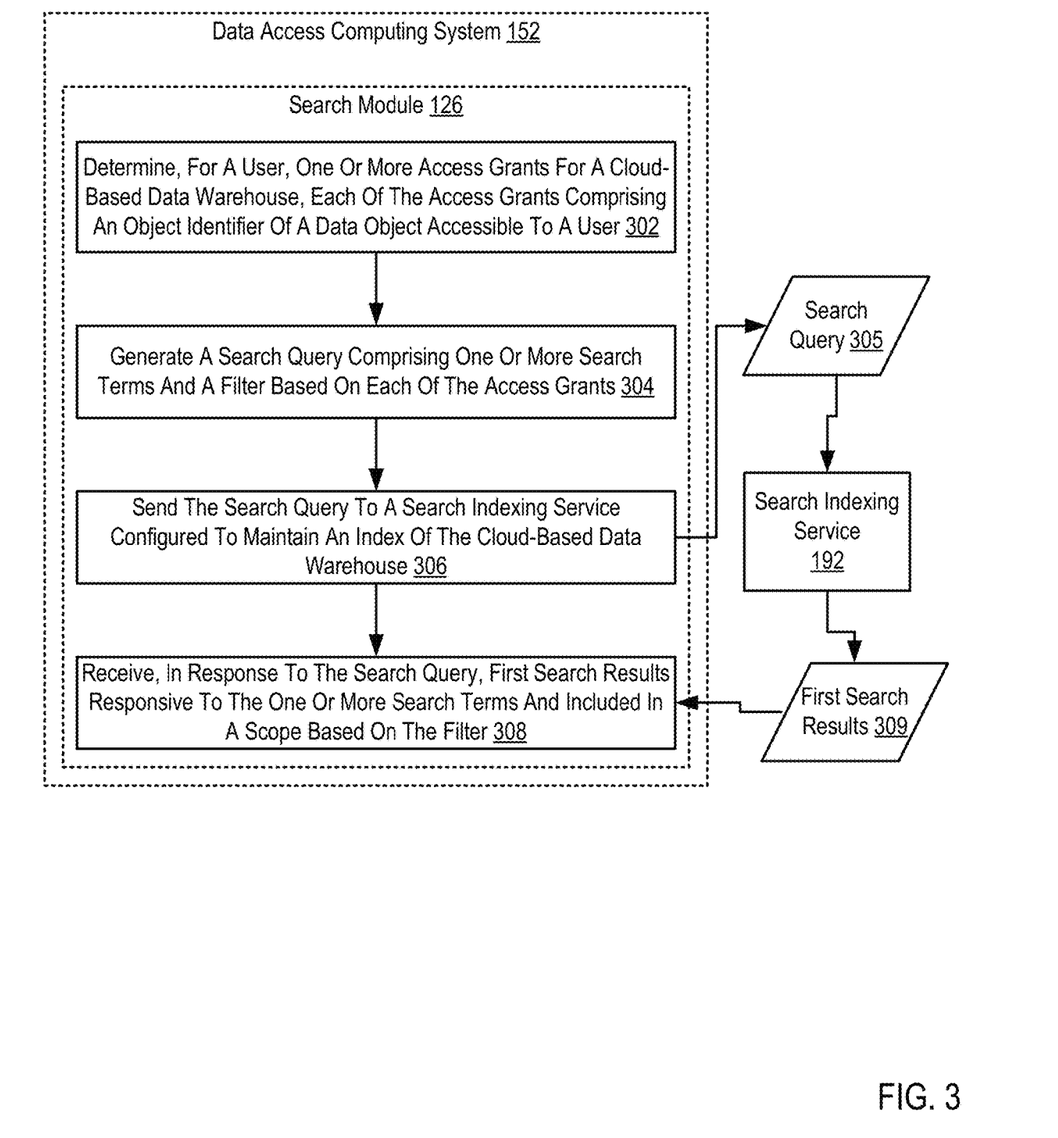
FIG. 3 sets forth a flow chart illustrating an exemplary method for search using data warehouse grants according to embodiments of the present invention.

For further explanation, FIG. 3 sets forth a flow chart illustrating an exemplary method for search using data warehouse grants according to embodiments of the present invention that includes determining (302), for a user, one or more access grants for a cloud-based data warehouse (192), each of the access grants comprising an object identifier of a data object accessible to the user. For example, the search module (126) may determine (302) the one or more access grants in response to receiving one or more search terms from the user. Determining the one or more access grants may comprise retrieving a listing of the one or more access grants for a user account of the user, or a role or group into which the user account is included. The determined one or more access grants may be expressed or encoded as a list of object identifiers, or as another data structure.

The method of FIG. 3 also includes generating (304) a search query (305) comprising one or more search terms (e.g., one or more search terms received from a user) and a filter based on each of the access grants for that user. The method of FIG. 3 further includes sending (306) the search query (305) to a search indexing service (192) configured to maintain an index (202) of the cloud-based data warehouse (196). Each entry in the index (202) may correspond to a data item stored in the cloud-based data warehouse (192) (e.g., a table, a view, a worksheet or other presentation of stored data, a file, a folder, etc.). Each entry in the index (202) may comprise an object identifier uniquely identifying the corresponding data object in the cloud-based data warehouse (192). Each entry in the index (202) may also comprise one or more keywords or other metadata describing the corresponding data object for matching with search terms included in a search query.

Each entry in the index (202) may also comprise an object lineage of the corresponding data object. For example, assume that the data objects are stored in the cloud-based data warehouse according to a hierarchy (e.g., a hierarchical file system). Each data object may have one or more parent data objects. For example, a file data object nested in one or more folders would have one or more folder data objects as parents. Each data object may also have one or more child data objects. For example, a folder data object may have one or more file data objects or one or more other folder data objects as children. As another example, a file data object may have no child data objects. An object lineage of an index (202) entry may indicate, for a given data object, each parent data object for that given data object. The object lineage of an index (202) entry may also indicate each child data object for the given data object. The object lineage may be expressed as one or more object identifiers.

The method of FIG. 3 also includes receiving (308), in response to the search query (305), first search results (309) responsive to the one or more search terms and included in a scope based on the filter. A search result responsive to the one or more search terms may comprise an entry of the index (202) comprising keywords or metadata matching the one or more search terms, having a degree of relevancy or similarity relative to the one or more search terms meeting a threshold, or is otherwise responsive to the one or more search terms.

The filter may comprise each data object identifier of the one or more access grants. The scope may then comprise each object identifier of the one or more access grants (e.g., included in the filter of the search query) and an object lineage of each data object identified in the one or more access grants (e.g., object lineages of each data object identified in the filter of the search query). Accordingly, a search result (e.g., an index (202) entry) is considered within the scope when the entry comprises either an indexed object identifier matching an object identifier in the filter (e.g., the one or more access grants for the user account), or comprises an object lineage including an object identifier in the filter. In other words, an index (202) entry is within the scope when its corresponding data object is explicitly identified in the filter, or when a parent data object of the corresponding data object is identified in the filter.

For example, the search indexing service (196) may be configured to identify, from a plurality of index (202) entries of the index (202), one or more index (202) entries responsive to the one or more search terms and comprising: an indexed object identifier included in the filter or an object lineage at least partially included in the filter. The search indexing service (196) may then generate the first search results (309) based on the identified one or more entries.

As an example, assume index (202) entries for data objects "A," "B," "C," and "D" are responsive to search terms included in a search query from a user. Assume a filter of the search query identifies data objects "A," "C," and "E." In other words, the user has access grants for data objects "A," "C," and "E." In this example, index (202) entries for data objects "A" and "C" would be included in search results as they are both responsive to the search terms of the search query and included in the scope based on the filter.

Continuing with the example above, assume that the index (202) entry for data object "B" also comprises an object lineage of "E→F," indicating that data object "B" is a child of parent data object "E," which is itself a child of parent data object "F." Though data object "B" is not explicitly indicated in the filter, the index (202) entry for data object "B" would still be included in the scope as its object lineage includes a data object identifier (data object "E") included in the filter.

Further continuing with this example, assume that the index (202) entry for data object "D" also comprises an object lineage of "G→F," indicating that data object "D" is a child of parent data object "G," which is itself a child of parent data object "F." Here, the index (202) entry for data object "D" would not be included in the scope as neither its indexed object identifier nor any object identifier in its object lineage are included in the filter.

Figure 4:
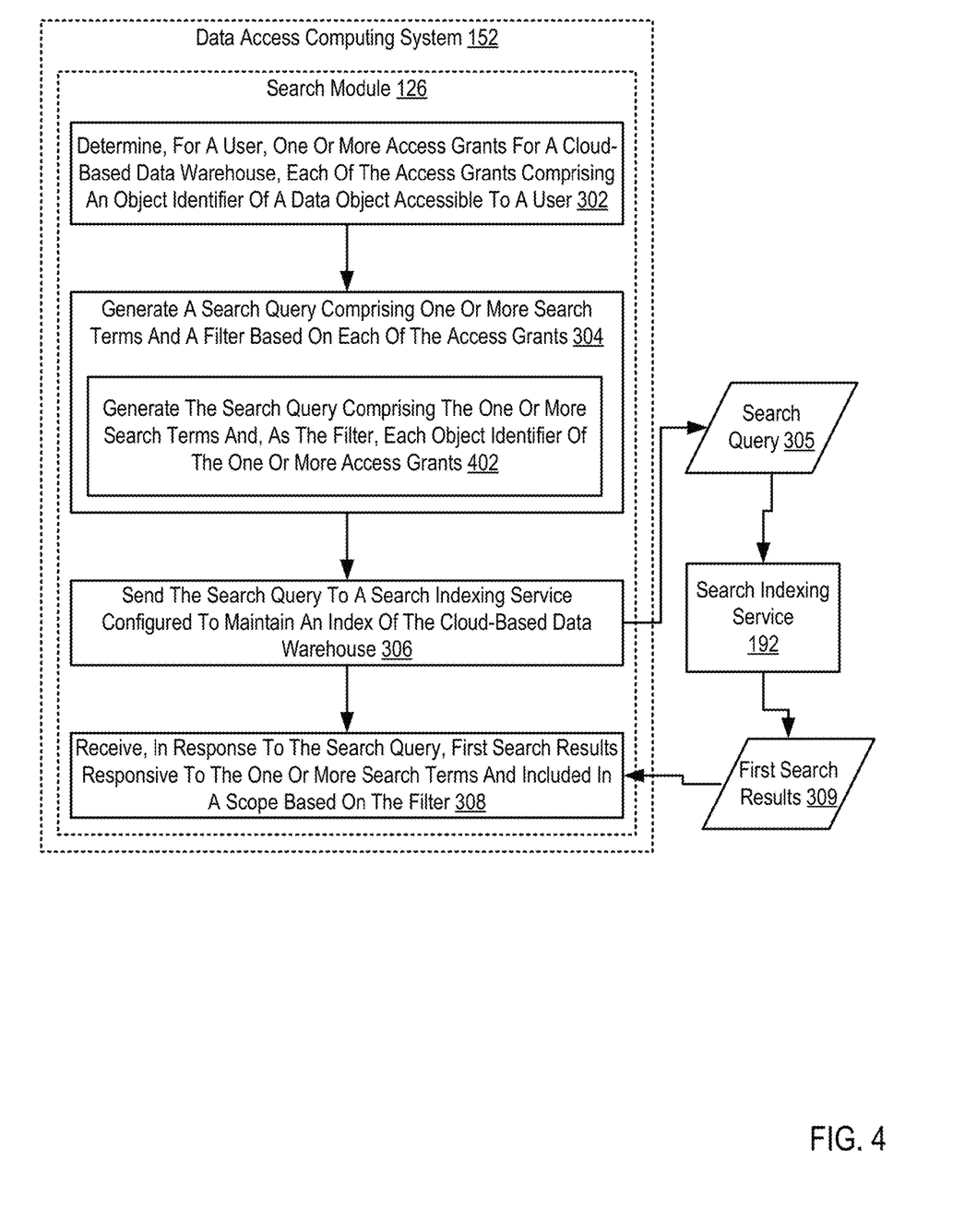
FIG. 4 sets forth a flow chart illustrating an exemplary method for search using data warehouse grants according to embodiments of the present invention.

For further explanation, FIG. 4 sets forth a flow chart illustrating an exemplary method for search using data warehouse grants according to embodiments of the present invention that includes determining (302), for a user, one or more access grants for a cloud-based data warehouse (192), each of the access grants comprising an object identifier of a data object accessible to the user; generating (304) a search query (305) comprising one or more search terms and a filter based on each of the access grants; sending (306) the search query (305) to a search indexing service (192) configured to maintain an index (202) of the cloud-based data warehouse (196), and receiving (308), in response to the search query (305), first search results responsive to the one or more search terms and included in the scope based on the filter.

The method of FIG. 4 differs from FIG. 3 in that generating (304) a search query (305) comprising one or more search terms and a filter based on each of the access grants includes generating (402) the search query comprising the one or more search terms and, as the filter, each object identifier of the one or more access grants. As an example, assume a user has access grants to data objects "A," "C," and "E." Further assume that the user has provided the search term "Dekalb County." The search module (126) would then generate a search query comprising the search term "Dekalb County" and object identifiers of each data object for which the user has access grants (e.g., data objects "A," "C," and "E." The scope would then comprise each object identifier of the one or more access grants (e.g., included in the filter of the search query) and an object lineage of each data object identified in the one or more access grants (e.g., object lineages of each data object identified in the filter of the search query). Thus, the search indexing scope receives a search query (305) comprising the search terms and a listing of each object identifier of data objects in the cloud-based data warehouse (196) to which the user has an explicit access grant. It is understood that the user may also have an implicit access grant to a data object having a parent data object for which the user has an explicit access grant.

Figure 5:
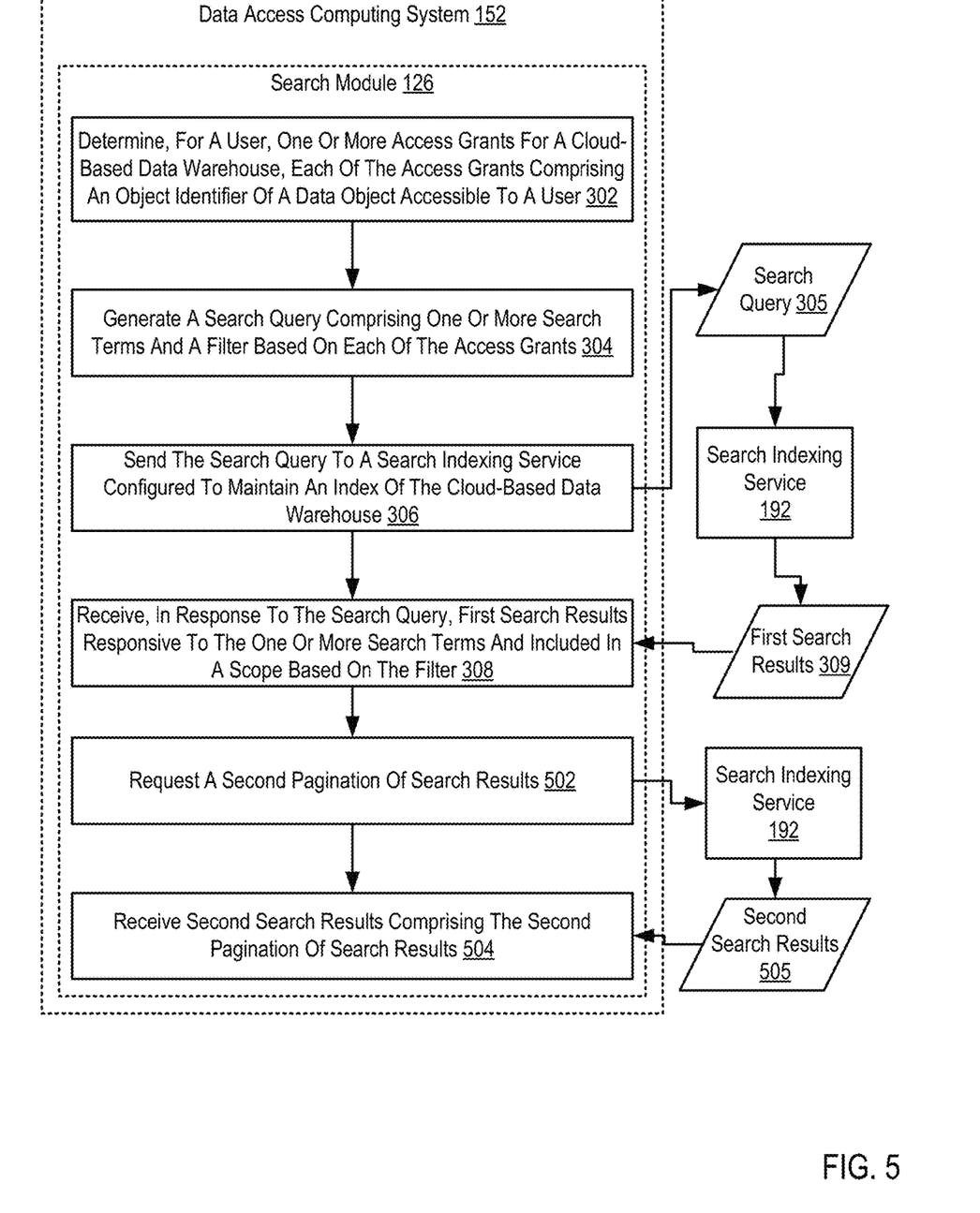
FIG. 5 sets forth a flow chart illustrating an exemplary method for search using data warehouse grants according to embodiments of the present invention.

For further explanation, FIG. 5 sets forth a flow chart illustrating an exemplary method for search using data warehouse grants according to embodiments of the present invention that includes determining (302), for a user, one or more access grants for a cloud-based data warehouse (192), each of the access grants comprising an object identifier of a data object accessible to the user; generating (304) a search query (305) comprising one or more search terms and a filter based on each of the access grants; sending (306) the search query (305) to a search indexing service (192) configured to maintain an index (202) of the cloud-based data warehouse (196), and receiving (308), in response to the search query (305), first search results responsive to the one or more search terms and included in the scope based on the filter.

The method of FIG. 5 differs from FIG. 3 in that the method of FIG. 5 includes requesting (502) (e.g., by the search module (126) from the search indexing service (192) a second pagination of search results). For example, the first search results (309) may comprise a first pagination of search results. A pagination of search results is a subset of search results comprising a number of search results less than or equal to a pagination threshold. For example, assuming a pagination threshold of 100 search results, the first search results (309) may comprise the first 100 search results of a corpus of search results generated by the search indexing service (192). The request for a second pagination of search results may then comprise a request for the next at most 100 search results.

The method of FIG. 5 also includes receiving (504) second search results (505) comprising the second pagination of search results. Accordingly, additional paginations of search results may be requested and received from the search indexing service (192) by the search module (126) without regenerating the corpus of search results or performing additional search operations.

Figure 6:
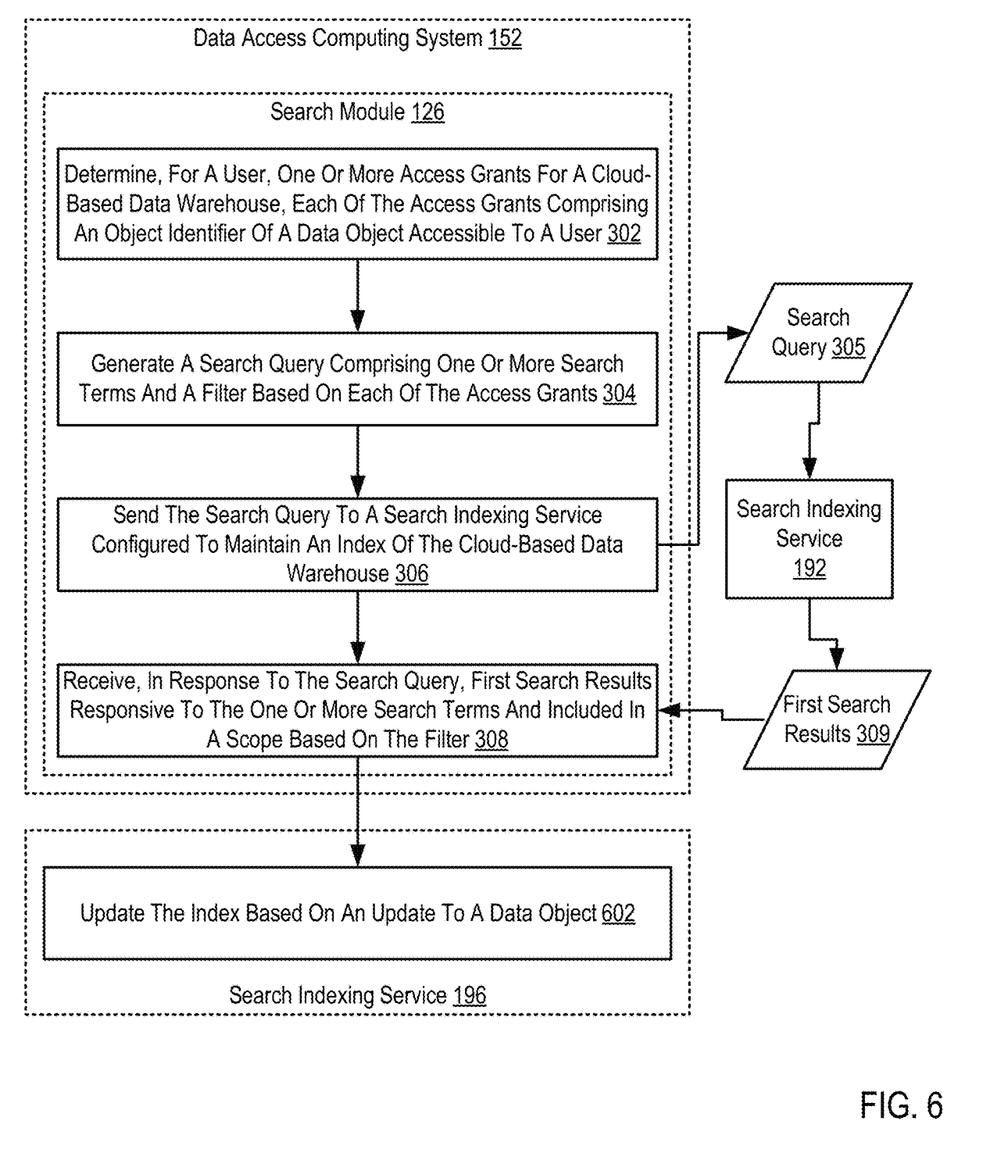
FIG. 6 sets forth a flow chart illustrating an exemplary method for search using data warehouse grants according to embodiments of the present invention.

For further explanation, FIG. 6 sets forth a flow chart illustrating an exemplary method for search using data warehouse grants according to embodiments of the present invention that includes determining (302), for a user, one or more access grants for a cloud-based data warehouse (192), each of the access grants comprising an object identifier of a data object accessible to the user; generating (304) a search query (305) comprising one or more search terms and a filter based on each of the access grants; sending (306) the search query (305) to a search indexing service (192) configured to maintain an index (202) of the cloud-based data warehouse (196), and receiving (308), in response to the search query (305), first search results responsive to the one or more search terms and included in the scope based on the filter.

The method of FIG. 6 differs from FIG. 3 in that the method of FIG. 6 includes updating (602) (e.g., by the search indexing service (196)) the index (202) based on an update to a data object. An update to a data object may include adding, removing, or modifying a data object in the cloud-based data warehouse (196). For example, in response to modifying a data object, a corresponding index (202) entry may be updated to include modified keywords or metadata describing the data object. As another example, in response to removing a data object, a corresponding index (202) entry may be removed. As a further example, in response to a data object being added, an index (202) entry may be created.

An update to a data object may also comprise a relocation of a data object in an object lineage. For example, a data object may be moved from one folder or location in a file system to another folder or location in the file system. Accordingly, the object lineage of the corresponding index (202) entry may be updated to reflect data objects serving as parents to the relocated data object. The object lineages of index (202) entries of children of the relocated data object may also be updated to reflect the relocation of the data object.

In view of the explanations set forth above, readers will recognize that the benefits of search using data warehouse grants according to embodiments of the present invention include:
  Improving the operation of a computing system by ensuring that search results reflect the access grants of a user.
  Improving the operation of a computing system by allowing for a single search query to be provided to a search indexing service to retrieve filtered search results.
  Improving the operation of a computing system by allowing for the search indexing service to assume the computational burden of filtering search results based on access grants.

Exemplary embodiments of the present invention are described largely in the context of a fully functional computer system for search using data warehouse grants. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of search using data warehouse grants, the method comprising:
    determining, for a user, one or more access grants for a cloud-based data warehouse, each of the access grants comprising an object identifier of a data object accessible to the user;
    generating a search query comprising one or more search terms and a filter based on each of the access grants;

sending the search query to a search indexing service configured to maintain an index of the cloud-based data warehouse; and receiving, from the search indexing service in response to the search query, first search results responsive to the one or more search terms and included in a scope based on each of the access grants.

2. The method of claim 1, wherein the scope comprises each object identifier of the one or more access grants and an object lineage of each data object identified in the one or more access grants.

3. The method of claim 1, further comprising:
identifying, by the search indexing service, from a plurality of index entries of the index, one or more index entries responsive to the one or more search terms and comprising: an indexed object identifier included in the filter or an object lineage at least partially included in the filter; and
generating the first search results based on the identified one or more index entries.

4. The method of claim 1, wherein generating the search query comprises generating the search query comprising the one or more search terms and, as the filter, each object identifier of the one or more access grants.

5. The method of claim 1, wherein the first search results comprise a first pagination of search results, and the method further comprises:
requesting a second pagination of search results; and
receiving second search results comprising the second pagination of search results.

6. The method of claim 1, further comprising updating, by the search indexing service, the index in response to an update to a data object.

7. The method of claim 6, wherein the update comprises one or more of a modification of the data object or a relocation of the data object in an object lineage.

8. An apparatus for search using data warehouse grants, the apparatus comprising a computer processor, a computer memory operatively coupled to the computer processor, the computer memory having disposed within it computer program instructions that, when executed by the computer processor, cause the apparatus to carry out the steps of:
determining, for a user, one or more access grants for a cloud-based data warehouse, each of the access grants comprising an object identifier of a data object accessible to the user;
generating a search query comprising one or more search terms and a filter based on each of the access grants;
sending the search query to a search indexing service configured to maintain an index of the cloud-based data warehouse; and
receiving, from the search indexing service in response to the search query, first search results responsive to the one or more search terms and included in a scope based on each of the access grants.

9. The apparatus of claim 8, wherein the scope comprises each object identifier of the one or more access grants and an object lineage of each data object identified in the one or more access grants.

10. The apparatus of claim 8, wherein the steps further comprise:
identifying, by the search indexing service, from a plurality of index entries of the index, one or more index entries responsive to the one or more search terms and comprising: an indexed object identifier included in the filter or an object lineage at least partially included in the filter; and
generating the first search results based on the identified one or more index entries.

11. The apparatus of claim 8, wherein generating the search query comprises generating the search query comprising the one or more search terms and, as the filter, each object identifier of the one or more access grants.

12. The apparatus of claim 8, wherein the first search results comprise a first pagination of search results, and the steps further comprise:
requesting a second pagination of search results; and
receiving second search results comprising the second pagination of search results.

13. The apparatus of claim 8, wherein the steps further comprise updating, by the search indexing service, the index in response to an update to a data object.

14. The apparatus of claim 13, wherein the update comprises one or more of a modification of the data object or a relocation of the data object in an object lineage.

15. A computer program product for search using data warehouse grants, the computer program product disposed upon a computer readable storage medium, the computer program product comprising computer program instructions that, when executed, cause a computer to carry out the steps of:
determining, for a user, one or more access grants for a cloud-based data warehouse, each of the access grants comprising an object identifier of a data object accessible to the user;
generating a search query comprising one or more search terms and a filter based on each of the access grants;
sending the search query to a search indexing service configured to maintain an index of the cloud-based data warehouse; and
receiving, from the search indexing service in response to the search query, first search results responsive to the one or more search terms and included in a scope based on each of the access grants.

16. The computer program product of claim 15, wherein the scope comprises each object identifier of the one or more access grants and an object lineage of each data object identified in the one or more access grants.

17. The computer program product of claim 15, wherein the steps further comprise:
identifying, by the search indexing service, from a plurality of index entries of the index, one or more index entries responsive to the one or more search terms and comprising: an indexed object identifier included in the filter or an object lineage at least partially included in the filter; and
generating the first search results based on the identified one or more index entries.

18. The computer program product of claim 15, wherein generating the search query comprises generating the search query comprising the one or more search terms and, as the filter, each object identifier of the one or more access grants.

19. The computer program product of claim 15, wherein the first search results comprise a first pagination of search results, and the steps further comprise:
requesting a second pagination of search results; and
receiving second search results comprising the second pagination of search results.

20. The computer program product of claim 15, wherein the steps further comprise updating, by the search indexing service, the index in response to an update to a data object.

* * * * *